United States Patent
Inoue et al.

(10) Patent No.: US 6,762,365 B2
(45) Date of Patent: Jul. 13, 2004

(54) CONNECTOR COVER FOR PROVIDING A WATER SHIELD BETWEEN A PIPE AND A CONNECTOR

(75) Inventors: Tomoki Inoue, Aichi-ken (JP); Kazuhito Kasahara, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/304,556

(22) Filed: Nov. 26, 2002

(65) Prior Publication Data

US 2003/0121691 A1 Jul. 3, 2003

(30) Foreign Application Priority Data

Nov. 26, 2001 (JP) ........................................ 2001-360156

(51) Int. Cl.[7] .............................................. H02G 15/08
(52) U.S. Cl. ...................... 174/84 R; 174/92
(58) Field of Search ............................ 174/84 R, 21 R, 174/65 G, 92, 74 A, 21 C, 215 S

(56) References Cited

U.S. PATENT DOCUMENTS 4,912,287 A * 3/1990 Ono et al. .............. 174/153 G

FOREIGN PATENT DOCUMENTS

| JP | 06-323483 | 11/1994 |
|---|---|---|
| JP | 11-006591 | 1/1999 |

\* cited by examiner

*Primary Examiner*—Chau N. Nguyen
(74) *Attorney, Agent, or Firm*—Andrus, Sceales, Starke & Sawall

(57) ABSTRACT

A connector cover for providing a water shield between a connector and a pipe comprises two cover elements. The cover elements are joined each other to construct a tubular water shield, which internally has a connector receiving portion on one axial side thereof for receiving a pipe inserting portion of a connector, and a pipe receiving portion on an opposite axial side thereof for receiving a pipe. The pipe receiving portion has a pipe receiving section on an opposite axial side thereof for receiving an opposite axial side from an annular projection of the pipe, and a projection receiving section on one axial side thereof for receiving annular projection. An inner diameter of the pipe receiving section is designed generally identical to an outer diameter of the pipe.

8 Claims, 8 Drawing Sheets

CONNECTOR COVER FOR PROVIDING A WATER SHIELD BETWEEN A PIPE AND A CONNECTOR

BACKGROUND OF THE INVENTION

The present invention relates to a connector cover which is adapted to cover a connector for connection in a piping, for example, in a fuel piping for a vehicle, and thereby provides a water shield or waterproofness between the connector and a pipe inserted and fitted in the connector to prevent water or the like from entering therebetween.

In a fluid piping structure where a pipe is connected or jointed to a tube, a connector is used for connecting or jointing the pipe to the tube. The connector typically has integrally a tube connecting portion on one axial side thereof to be connected to the tube, and a pipe inserting portion on an opposite axial side thereof to be connected to the pipe. A connecting portion between the connector or the pipe inserting portion and the pipe is provided with a connector sealing member or members to protect against leak out of an internal fluid. The connector sealing member concurrently prevent foreign materials such as water entering the connecting portion therebetween from outside. However, since the connector such as located on an underside of a vehicle body is subject to a heavy splash of rain water or the like, for example, from road surfaces, it is preferred to provide a water shield by covering around the connecting portion between the pipe and the connector.

On the other hand, in such piping system, for example, a pipe is formed with an annular engagement projection around one axial side of an outer peripheral surface thereof, and a connector is configured with a retainer to be fitted in a pipe inserting portion thereof. Then, the pipe is inserted into the retainer so that the annular engagement projection snap-engages with one axial end portion of the retainer providing a stop mechanism that prevents the pipe coming off the connector, and consequently, the pipe is completely connected to the connector. If an operator does not take care sufficiently to complete connection between the pipe and the connector, the pipe might not be fully inserted into the retainer and the annular engagement projection of the pipe might not snap-engage with one axial end portion of the retainer, or the retainer might not be fitted properly in the pipe inserting portion of the connector. That is, the pipe might be in a half-fitting relation with respect to the connector. In case of the piping system subject to operation while the pipe is incompletely connected with the connector, usually sealing property by the connector sealing member between the pipe and the connector becomes lowered, and an internal fluid leaks out. Therefore, it is required to supply a mechanism for verifying easily a complete connection between the pipe and the connector. Such mechanism, for example, includes an annular projection arranged and provided on an outer periphery of the pipe so as to be located axially outside of the connector when the pipe is inserted and fitted in the connector, and a connector clip, for example, as disclosed in JP, A, 11-6591, to be mounted on the pipe and the connector which enables to verify easily a complete connection therebetween.

Meanwhile, a connector cover is mounted on the connecting portion between the pipe and the connector, in order to provide a water shield thereto. If such a connector clip is mounted on the connecting portion therebetween for verifying a full connection of the pipe and the connector, the connector cover resultingly is mounted further over the connector clip to the connecting portion. Then, the connecting portion will be oversized, and an assembly process including a work for mounting the connector clip and a work for mounting the connector cover will be bothersome to an operator.

SUMMARY OF THE INVENTION

In view of a foregoing aspect, it is an object of the present invention to provide a connector cover having a checking function for easily verifying that a pipe is completely inserted and fitted in a connector when mounting the connector cover on the connecting portion between the pipe and the connector, as well as providing a water shield therebetween.

In order to achieve the aforementioned object of the present invention, there is provided a novel connector cover adapted to be mounted to a connector for a fluid path and a pipe inserted in and snap-engaged with the connector, and to provide a water shield therebetween. The connector is formed with a tube connecting portion on one axial side thereof, and a pipe inserting portion on an opposite axial side thereof, or at least on an opposite axial side thereof. The pipe is inserted from an opening of an opposite axial end of the pipe inserting portion therein for snap-fit in the connector or the pipe inserting portion. The pipe or the insertion end portion of the pipe inserted into the pipe inserting portion is sealed by a connector sealing member or members disposed or provided therein with respect to the connector or the pipe inserting portion. The pipe is provided with an annular projection on an outer periphery thereof to be located axially outwardly from the opening of the pipe inserting portion.

The connector cover comprises a mounting body for being mounted on a connecting portion between the pipe and the connector. More specifically, the mounting body is mounted to a length from the pipe inserting portion of the connector to an opposite axial side from the annular projection of the pipe, for constituting a tubular water shield. The connector cover or the mounting body may comprise two or a pair of cover elements or cover members, which may be integrally connected together, to constitute a tubular water shield or a tubular water shield assembly for the connector and the pipe. A pair of cover elements are joined each other so as to radially hold therebetween and enclose a length from the pipe inserting portion to an opposite axial side from the annular projection of the pipe.

The tubular water shield or the tubular water shield assembly is formed internally with or has an inner periphery configuration with a connector receiving portion on one axial side thereof for receiving the pipe inserting portion of the connector, and a pipe receiving portion on an opposite axial side thereof for receiving the pipe including the annular projection. The connector receiving portion receives the pipe inserting portion so that one axial side of the connector extends or projects axially outwardly from one axial end portion of the tubular water shield, and the pipe receiving portion receives the pipe including the annular projection so that an opposite axial side of the pipe extends or projects from an opposite axial end portion of the tubular water shield. The pipe receiving portion is formed with a projection receiving section on one axial side thereof for receiving the annular projection of the pipe, and a pipe receiving section on an opposite axial side thereof for receiving a portion of an opposite axial side from the annular projection of the pipe. A diameter or an inner diameter of the pipe receiving section is sized generally identical to an outer diameter of the pipe to be received therein.

The mounting body or the cover elements respectively may be made of resin in thin wall configuration, the pipe may be made of metal, and the connector may be made or resin or metal. Typically, an annular engagement projection is formed around an outer peripheral surface of the pipe, on one axial side or an insertion side from the annular projection, then, a retainer is fitted in the pipe inserting portion of the connector or fitted on an outer periphery of the pipe inserting portion of the connector, for example, releasably. And, on the occasion of connecting the pipe and the connector, the pipe is inserted in the pipe inserting portion or in the retainer so that the annular engagement projection is snap-engaged with the retainer or one axial end portion of the retainer On the occasion of release of connection therebetween, for example, the retainer in engagement with the pipe is relatively pulled out of the connector, or engagement between the retainer and the pipe is released by means of a release tool or by deforming of the retainer, and the pipe only is relatively pulled out of the connector. The connector has the tube connecting portion on one axial side thereof and the pipe inserting portion on an opposite axial side thereof. Any connector provided with a tube connection portion at one axial end portion of a pipe inserting portion thereof falls into the concept of the connector of the present invention. Also, a tube connecting portion of the present invention means any connecting portion of various members being connected to the pipe.

The connector receiving portion usually receives and encloses the pipe inserting portion of the connector (at least an opposite axial side of the pipe inserting portion) so as to be kept axially in place, that is, to be kept from axial displacement with respect to the tubular water shield, or to be allowed for only slight axial displacement, however, substantially for no axial displacement with respect to the tubular water shield. One axial side of the connector extends outwardly from one opening of the tubular water shield (an opening of the connector receiving portion), that is, an opening of one axial end portion of the tubular water shield. An opposite axial side of the pipe extends outwardly from the other opening of the tubular water shield (an opening of the pipe receiving portion or the pipe receiving section), that is, an opening of an opposite axial end portion of the tubular water shield. The openings of the tubular water shield are sealed liquid-tightly with respect to the connector and to the pipe respectively, for instance, by a sealing member or members for the opening, or a cover sealing member or members. The cover sealing member may be formed in a loop along an outer edge portion of the cover element. The contact portions or the contact surfaces of two cover elements are also sealed liquid-tightly, for instance, by a cover sealing member or members or a sealing member or members for cover.

The pipe receiving section of the pipe receiving portion is typically formed in a simple cylindrical shape, and is adapted to receive and enclose a portion of an opposite axial side from the annular projection of the pipe. The pipe receiving section has an inner diameter or a diameter substantially identical to an outer diameter of the pipe, that is, an outer diameter of an opposite axial portion from the annular projection of the pipe. That means the pipe receiving section does not have sufficient size or inner dimension to receive the annular projection of the pipe. Therefore, if the pipe is not sufficiently or correctly fitted in the connector or one axial side of the pipe is not inserted of sufficient length in the connector, that is, the pipe is incomplete fitting relation with respect to the connector, and thereby the annular projection of the pipe is located in an area of the pipe receiving section, the mounting body cannot be mounted on the pipe and the connector, or the cover elements cannot be joined one to the other. Even if the mounting body could be mounted or the cover elements could be joined, the mounting body or the cover elements would have resultingly been deformed by force. Thus, it can be easily judged whether the pipe is correctly fitted in the connector on mounting the mounting body or joining the cover elements each other (that is, on mounting the connector cover). Usually, the connector cover is constructed so that the annular projection is to be located in an area of the pipe receiving section when the pipe is located deviating somewhat toward an opposite axial side with relation to the connector compared to the case that the pipe is correctly fitted in the connector. Under the situation where the pipe is correctly inserted and fitted in the connector, the mounting body can be mounted smoothly, or the cover elements can be joined each other smoothly as the annular projection of the pipe is received in the projection receiving section of the pipe receiving portion. And, typically, the annular projection of the pipe is received in the projection receiving section so as to be kept in place in relation to an opposite axial side with respect to the tubular water shield. For example, the annular projection of the pipe is received in the projection receiving section in abutment relation with or like in abutment relation with a radial internal surface between the projection receiving section and the pipe receiving section. Then, normally, the pipe is substantially locked against axial movement out of the connector cover, and thereby the pipe is protected against coming out of the connector.

The connector cover providing a water shield between a pipe and a connector of the present invention cannot be mounted to the pipe and the connector, or should be forcibly mounted thereto when the pipe is not fully inserted or fitted in the connector. However, it may occur that the mounting body is mounted to the pipe and the connector, or the cover elements are joined each other smoothly without problem although the pipe is not completely inserted into the connector. Because an annular projection of the pipe may be located out of the pipe receiving section of the pipe receiving portion, in other words, may be located outside the opening of an opposite axial end portion of the tubular water shield. In such case, if the connector and the pipe are sealed therebetween, even not sufficiently, an inspection fluid might not leak out when the inspection fluid flows in the connector and the pipe at sealing property test. As a result, incomplete connection between the pipe and the connector may be overlooked, and there might be a possibility that the piping is subject to operation wherein the pipe is not fully fitted in the connector. According to this aspect, a pipe receiving portion is preferably formed to have a pipe receiving section with an axial length equal to or longer than an axial distance between one axial end or an insertion end of the pipe fitted in and snap-engaged with the connector or the retainer (correctly inserted and fitted in the connector) and an opposite axial end of the connector sealing member. In thus arrangement, if the annular projection of the pipe is located outside the pipe receiving section of the pipe receiving portion under incomplete connecting relation between the pipe and the connector, the mounting body can be mounted on the pipe and the connector smoothly or the cover elements can be joined smoothly without problem. However, one axial end of the pipe does not reach the connector sealing member, or slightly contact the connector sealing member. Thus, the inspection fluid certainly leaks between the pipe and the connector at sealing property test and thereby it is ensured to verify that the pipe is not fully fitted in the connector. If a plurality of connector sealing members are disposed axially in side by side relation, an axial length of the pipe receiving section may be designed longer than an axial distance between one axial end of the pipe and an opposite axial end of the connector sealing member located on the most opposite axial side.

Alternatively, an axial length of the pipe receiving section of the pipe receiving portion may be designed longer than an axial distance between the annular engagement projection and the annular projection of the pipe. In this arrangement, under the situation where the annular projection of the pipe is located outside the pipe receiving section of the pipe receiving portion, the annular engagement projection of the pipe stays in an area of the pipe receiving section, resulting that the connector cover cannot be mounted to the connector and the pipe, at least smoothly. Thereby it is verified that the pipe is not fully inserted and fitted in the connector.

In many cases, a cover sealing member or members are provided between two cover elements, between one axial end portion of the tubular water shield and the connector, and between an opposite axial end portion thereof and the pipe, in order to provide an enhanced water shield or waterproofness therebetween. The cover sealing member may be formed integrally along with the cover element in two-shot injection molding process. In this case, material for the cover sealing member may be selected in view of compatibility with the cover element in two-shot injection molding process. For example, if the cover element is made of polyester resin, the cover sealing member may be made of ester thermoplastic elastomer or ester TPE (TPEE). If the cover element is made of polypropylene resin, the cover sealing member may be made of olefin thermoplastic elastomer or olefin TPE (TPO).

It is preferred that two cover elements are hinged each other on one radial end portions (one end portions in direction transversely to an axis) thereof, so as to enable easily to mount the connector cover to the connector and the pipe. It is effective that one-touch lock mechanism is provided between opposite radial end portions of two cover elements so as to enable to more easily mount thereto. The cover elements may be formed of two halves respectively in a shape like half-cut generally of a cylinder or generally of a tubular body along an axis thereof, Typically, the connector cover is provided through with a drain passage to enable to easily verify leak-out of inspection fluid applied at sealing property test or of actual fluid under actual operation. Inspection fluid or fluid which leaks out between the pipe and the connector flows in the tubular water shield or connector cover, and then is discharged through out of the drain passage. In an actual arrangement wherein an exhaust pipe is disposed in proximity to the connector adapted for a gasoline fuel piping in a vehicle, if the drain passage is provided on a side in proximity to the exhaust pipe and gasoline fuel leaked out is discharged on a side in proximity thereto, the discharged gasoline fuel might catch fire. Therefore, it is effective that the connector cover is constructed to form the tubular water shield wherein the drain passage is located distant from the exhaust pipe or a side distant therefrom.

A connector, a pipe inserted and fitted in a pipe inserting portion of the connector, and a connector cover mounted on the connector and the pipe construct a water shield or waterproof structure for connector.

And, a connector, a pipe inserted and fitted in the inserting portion of the connector, a connector cover mounted on the connector and the pipe, and an exhaust pipe construct a water shield or waterproof structure for piping.

As described above, a connector cover for providing a water shield of the present invention has a checking function to easily verify that a pipe is completely inserted and fitted in a connector at mounting the connector cover thereto, and thus it can be prevented by adapting the connector cover that the connector and the pipe in half-fitting relation are subject to an operation.

Now, the preferred embodiments of the present invention will be described in detail with reference to the drawings.

DESCRIPTION OF THE PREFERRED EMBODIMENTS

Figure 1:
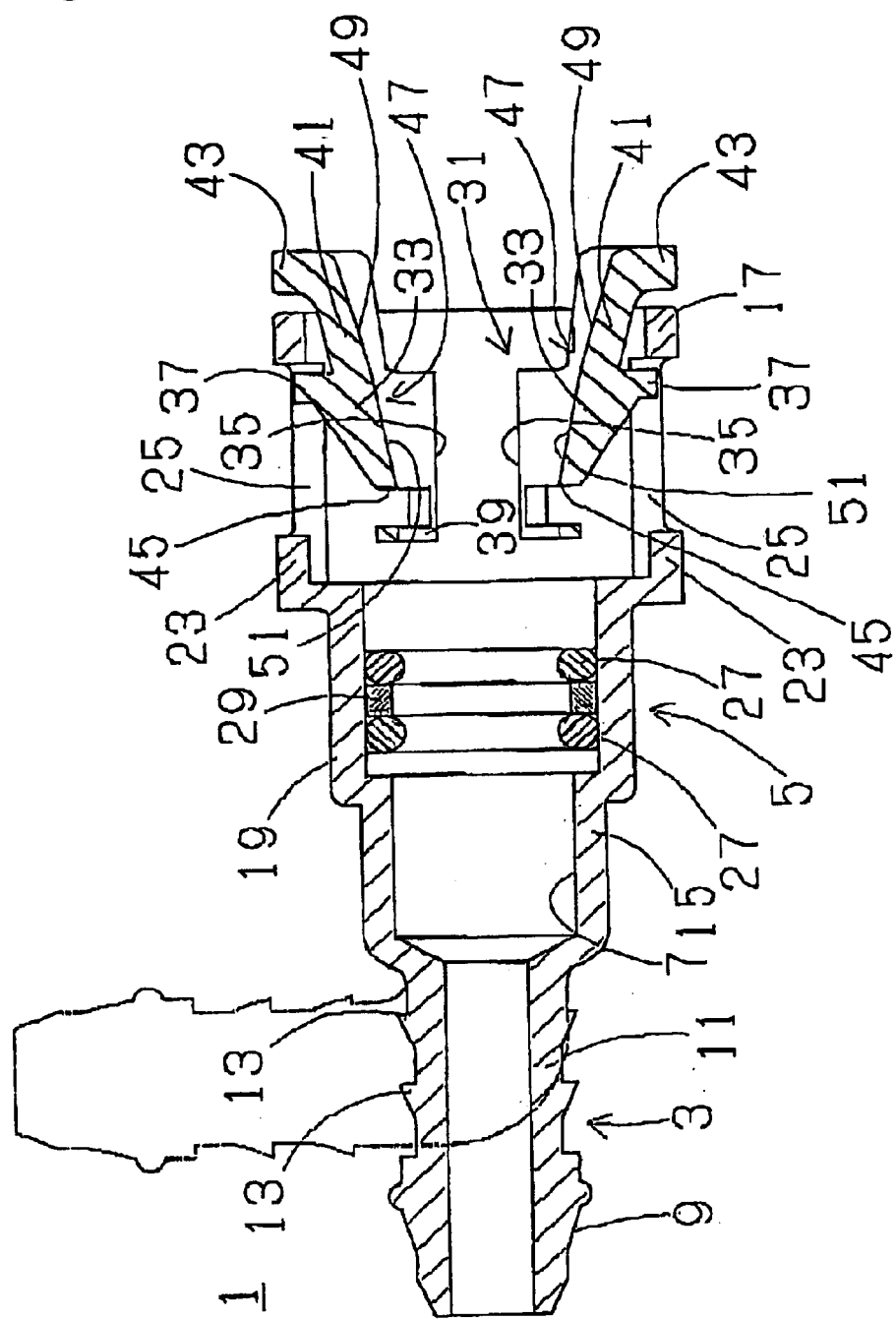
FIG. 1 is a sectional view of a connector to which a connector cover of the present invention is to be mounted.

A connector 1 shown in FIG. 1, which is adapted for connection in a gasoline fuel piping in a vehicle, is made of glass-fiber reinforced polyamide (PA/GF) and is formed overall in a cylindrical shape. The connector 1 integrally comprises a resin tube connecting portion 3 of cylindrical shape on one axial side thereof, and a pipe inserting portion 5 on an opposite axial side thereof. The connector 1 is provided with a bore 7 therein through from one axial end to an opposite axial end thereof. The resin tube connecting portion 3 has one axial side portion 9 of which an outer peripheral surface generally gently expanding in diameter in a direction of an opposite axial side, and an opposite axial side portion 11 on an opposite axial side from the one axial side portion 9. The opposite axial side portion 11 has an outer peripheral surface extending in a simple cylindrical shape. However, the outer peripheral surface of the opposite axial side portion 11 is provided therearound with two annular stopper projections 13, 13 respectively of a right triangle in cross-section expanding in diameter in an opposite axial direction, in axially spaced relation. A resin tube (not shown) is tightly fitted on and connected to an outer peripheral surface of the resin tube connection portion 3. The pipe inserting portion 5 comprises a cylindrical link portion 15 which is integrally provided with the resin tube connecting portion 3 in connected relation on one axial side of the pipe inserting portion 5, a tubular holder portion 17 of enlarged diameter on an opposite axial side of the pipe inserting portion 5, and a cylindrical sealing portion 19 in the middle axially of the pipe inserting portion 5, sized smaller than the tubular holder portion 17 in diameter, but larger than the cylindrical link portion 15 in diameter. A peripheral wall of the tubular holder portion 17 of the pipe inserting portion 5 comprises flat panel-like portions 21, 21 located in diametrical opposite positions thereof (refer to FiG. 4), and arcuate portions 23, 23 respectively arranged between the flat panel-like portions 21, 21. The arcuate portions 23, 23 are provided with engagement windows 25, 25 in opposed relation to each other respectively. In the cylindrical sealing portion 19 of the pipe inserting portion 5, a pair of O-rings 27, 27 (connector sealing member in ring-shape) are fitted axially in side-by-side relation with a collar 29 therebetween within the inner peripheral surface thereof. In some cases, the tube connecting portion 3 of the connector 1 may be formed on the cylindrical link portion 15 at an angle with respect to the pipe inserting portion 5 (refer to the dash-double dot lines of FIG. 1: at right angle with respect to the pipe inserting portion 5 here).

Figure 2:
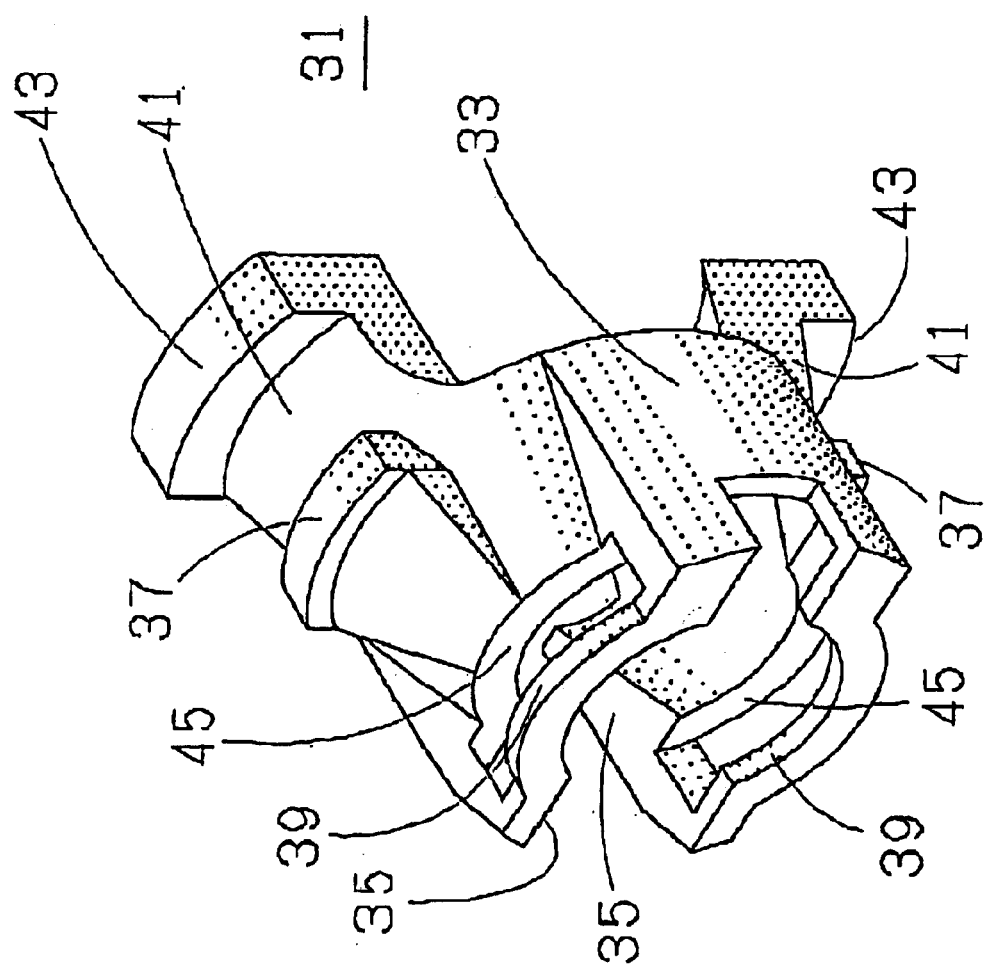
FIG. 2 is a perspective view of a retainer.

A retainer 31 made of PA is fitted in the tubular holder portion 17 of the pipe inserting portion 5. This retainer 31 is relatively flexible, and is formed so as to be resiliently deformable. As shown in FIG. 2, the retainer 31 has a main body 33 of C-shape in cross-section wherein a relatively large space is defined between circumferential opposite ends 35, 35 thereof. The main body 33 is provided with a pair of stopper portions 37, 37 projecting radially outwardly in diametrical opposed positions of an opposite axial end portion thereof. An inner surface of the main body 33 tapers generally in the direction to one axial end thereof so as to reduce gradually an inner diameter thereof. One axial end portion of the main body 33 serves as an engagement portion 39, generally defining an inner diameter substantially identical to an outer diameter of a pipe (refer to the reference numeral 53 in FIG. 3). A pair of operation arms 41, 41 are integrally formed on an opposite axial end portion of the main body 33 of the retainer 31 so as to extend inclining radially outwardly in an opposite direction axially from respective circumferential positions corresponding to the stopper portions 37, 37. The operation arms 41, 41 have latching ends 43, 43, projecting radially outwardly on an opposite axial end portions thereof respectively. The engagement portion 39 is provided with engagement slits 45, 45 extending circumferentially in diametrical opposed relation to each other. Thus configured retainer 31 is inserted and fitted in the tubular holder portion 17 of the inserting portion 5, so that the stopper portions 37, 37 are seated in the engagement windows 25, 25, and that the latching ends 43, 43 are in engagement relation with the tubular holder portion 17 on an opposite axial end thereof. The retainer 31 has opposed inner surface portions 47, 47 of arcuate in cross-section which are extending respectively from the operation arms 41, 41 to the engagement slits 45, 45 and are substantially tapered respectively in a direction of one axial side toward the center or the central axis of the retainer 31. The tapered inner surface portions 47, 47 of the retainer 31 comprises a tapered inner surface 49 of the operation arm 41 and a tapered inner surface portion 51 of the main body 33 of the retainer 31 respectively. The opposed inner surface portions 51, 51 in the main body 33 are tapered at somewhat smaller angle than the inner surfaces 49, 49 of the operation arms 41, 41. And then the retainer 31 is configured so that the annular engagement projection (refer to the reference numeral 55 in FIG. 3) of the pipe necessarily or substantially necessarily abuts the opposite ends of the tapered inner surfaces 51, 51 when the pipe is inserted from the side of the latching ends 43, 43 of the operation arm 41, 41. That is, the annular engagement projection abuts the tapered inner surface portions 47, 47 of the retainer 31 at a boundary between the operation arm 41 and the main body 33 at insertion of the pipe.

Figure 3:
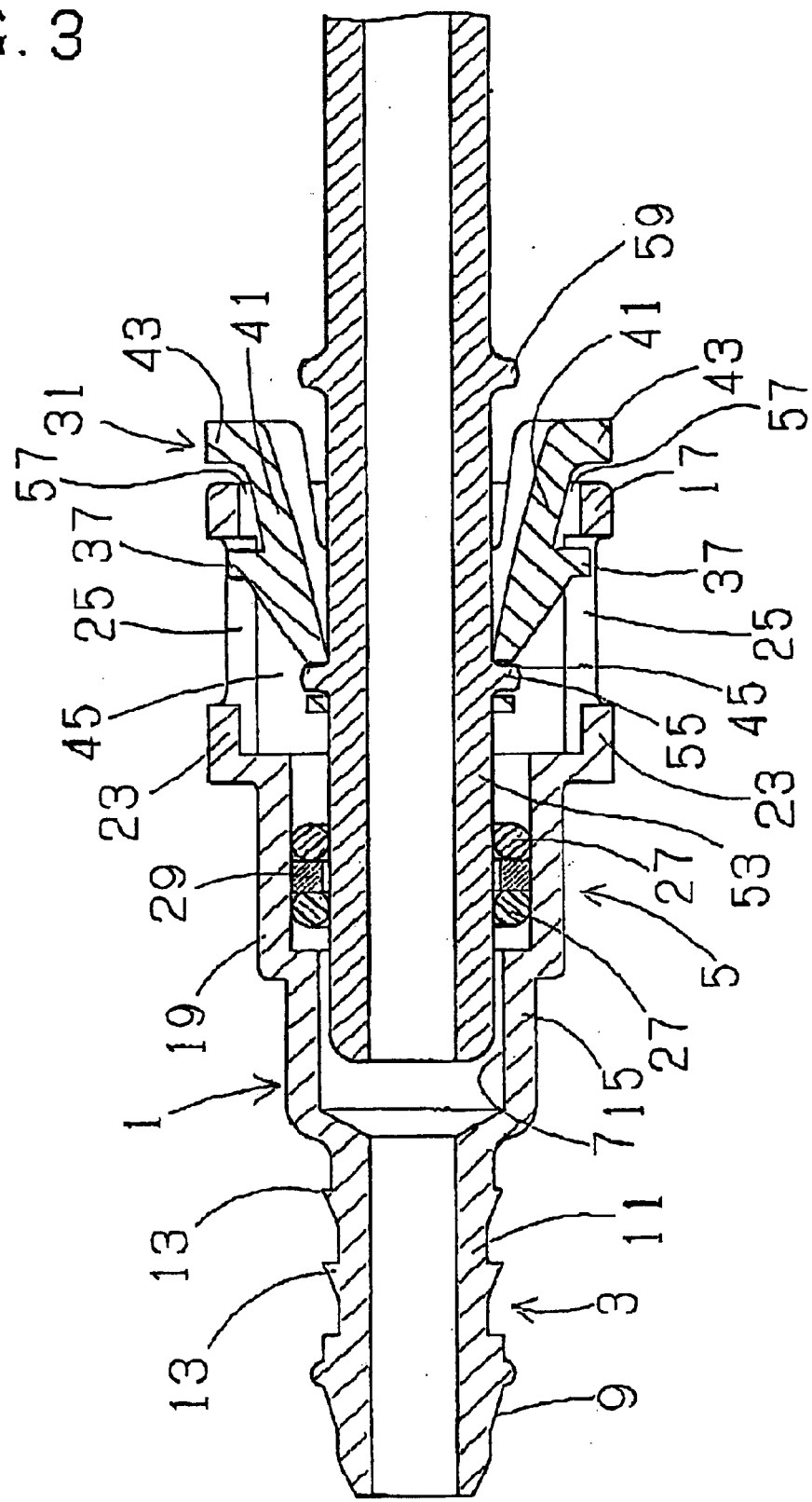
FIG. 3 is a sectional view showing a case that a pipe is inserted and fitted in the connector.

The pipe 53 made of a metal, as shown in FIG. 3, is inserted from an opening 57 on an opposite axial end of the pipe inserting portion 5 of the connector 1 and fitted therein. The pipe 53 is provided with an annular engagement projection 55 on one axial side of an outer peripheral surface thereof, and further, an annular projection 59 with substantially same configuration as the annular engagement projection 55 on an opposite axial side from the annular engagement projection 55 of an outer peripheral surface thereof. The pipe 53 is pushed and inserted in the connector 1 so that the annular engagement projection 55 progresses radially expanding inner surface of the main body 33 of the retainer 31 until the annular engagement projection 55 seats in the engagement slits 45, 45 in snap-engagement relation therewith. The annular engagement projection 55 which has snap-engaged in the engagement slits 45, 45 of the main body 33 of the retainer 31 blocks or limits further axial in-and-out movement of the pipe 53 with respect to the connector 1. That is, the pipe 53 is thereby almost locked against relative axial movement in the connector 1. One axial end or an insertion end of the pipe 53 reaches in the cylindrical link portion 15 beyond a pair of O-rings 27, 27, and thereby a seal is formed by the O-rings 27, 27 between an outer periphery surface of the pipe 53 and the inner peripheral surface of the connector 1.

In the event of removing relatively the pipe 53 from the connector 1, the latching ends 43, 43 of the operating arms 41, 41 are pressed radially inwardly from outside to narrow a radial space therebetween, thus a radial space between the stopper portions 37, 37. And thereby the stopper portions 37, 37 are out of the engagement windows 25, 25, and the retainer 31 can be relatively pulled out of the connector 1. As the retainer 31 is relatively pulled out of the connector 1, the pipe 53 will have been also pulled out of the connector 1 along with the retainer 31.

Figure 4:
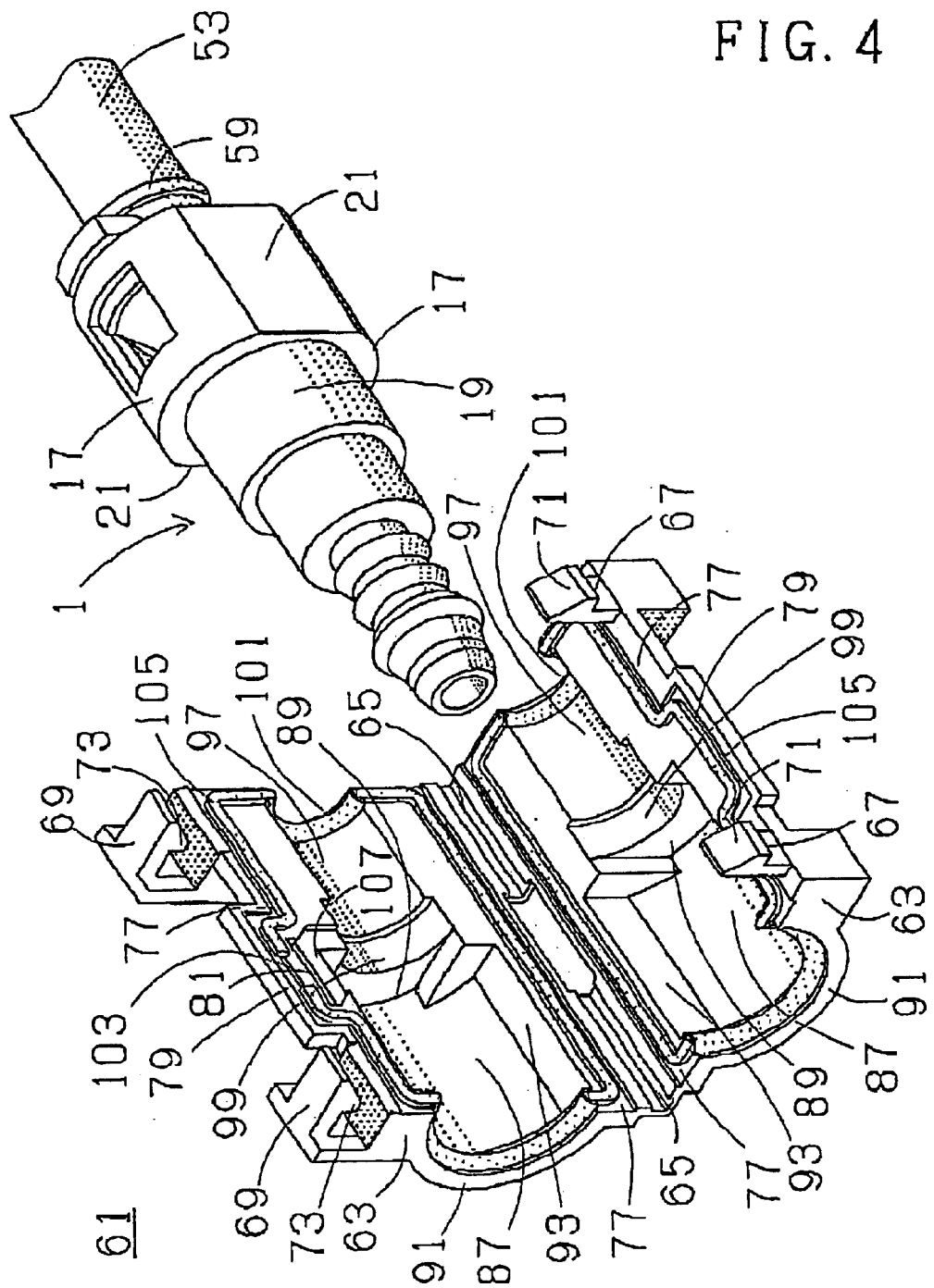
FIG. 4 is a perspective view showing an internal configuration of a connector cover of the present invention.
Figure 5:
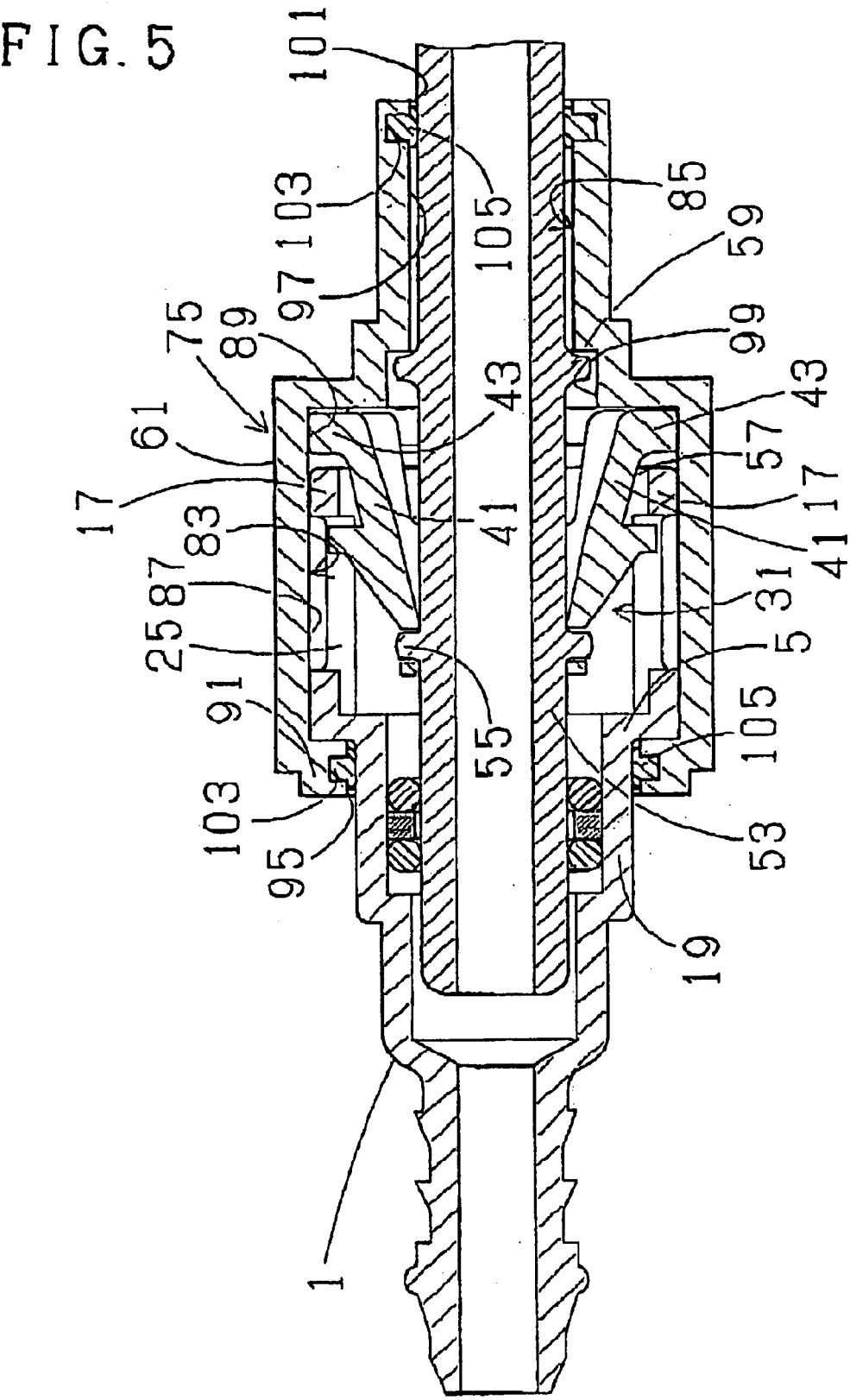
FIG. 5 is a sectional view showing a case that the connector cover is mounted to the connector and the pipe.

A connector cover 61 for providing a water shield between a pipe 53 and a connector 1, shown in FIG. 4, is adapted to cover a length between the cylindrical sealing portion 19 of the connector 1 and the opposite axial side from the annular projection 59 of the pipe 53. The connector cover 61 comprises cover elements 63, 63, of two halves of respectively in a shape like half-cut generally of a cylinder or generally of a tubular body along an axis thereof, which are connected to or hinged each other on one radial or widthwise end portions thereof by a hinge. A one-touch lock mechanism is provided between opposite radial or widthwise end portions of the cover elements 63, 63. Two cover elements 63, 63 function as a mounting body of the connector cover 61. A hinge comprises a pair of foldable joint portions 65, 65 which are integrally formed and connected between one radial end portions of cover elements 63, 63, and the foldable joint portions 65, 65 are arranged on axial opposite sides of the connector cover 61 or cover elements 63, 63. The one-touch lock mechanism comprises a pair of cover stopper portions 67, 67 on axial opposite sides of an opposite radial end portion in one cover element 63, and a pair of cover hook portions 69, 69 on axial opposite sides of an opposite radial end portion in the other cover element 63. The cover stopper portions 67, 67 and the cover hook portions 69, 69 are resiliently deformable. The cover stopper portions 67, 67 respectively has a stopper 71 projecting radially outwardly, and the cover hook portions 69, 69 respectively has a hook 73 projecting radially inwardly. When an operator presses the opposite radial end portions of two cover elements 63, 63 from outside, the joint portions 65 are folded, and the stoppers 71 and the hooks 73 are interengaged resulting that the cover elements 63, 63 are joined together. In this manner, as shown in FIG. 5, a tubular water shield 75 is completed. Each of the cover elements 63, 63 is provided with contact portions 77, 77 along one radial end portion and an opposite radial end portion thereof. The contact portions 77, 77 of the cover elements 63, 63 on opposite radial end portions are provided respectively with an extended portion 79 projecting radially outwardly on an axial center portion thereof. The extended portion 79 of the other cover elements 63 is provided through with a drain passage 81.

The tubular water shield 75 is formed internally with or has an inner periphery configuration with a connector receiving portion 83 on one axial side thereof for receiving the pipe inserting portion 5 of the connector 1, more particularly, an opposite axial side of the cylindrical seal portion 19 and tubular holder portion 17 entirely, and a pipe receiving portion 85 on an opposite axial side thereof for receiving a portion of a pipe 53 extending outside from the opening 57 on an opposite axial end of the pipe inserting portion 5 of the connector 1, or outside from latching ends 43, 43 of operation arms 41, 41 of the retainer 31. The connector receiving portion 83 comprises a connector receiving section 87 for receiving the tubular holder portion 17 entirely, and a retainer receiving section 89 on an opposite axial side from the connector receiving section 87 for receiving latching ends 43, 43 of the retainer 31. The connector receiving section 87 is defined in an inner periphery configuration conforming to an outer periphery of the tubular holder portion 17 of the connector 1, that is, in a tubular inner periphery configuration with flat side inner surfaces 93, 93 conforming to the flat panel-like portions 21, 21, on opposite radial sides thereof. An annular inward portion 91 is provided on one axial end portion of the connector receiving section 87, extending somewhat radially inwardly or expanding somewhat radially inwardly. In the retainer receiving section 89, a width or a distance between portions corresponding to flat side inner surfaces 93, 93 of the connector receiving section 87 is defined further narrower. An inner periphery of the annular inward portion 91 defines an opening 95 of one axial end portion of the tubular water shield 75, which receives an opposite axial side of the cylindrical seal portion 19.

The pipe receiving portion 85 comprises a pipe receiving section 97 on an opposite axial side thereof for receiving an opposite axial side from the annular projection 59 of the pipe 53, and a projection receiving section 99 on one axial side thereof for receiving the annular projection 59 of the pipe 53. The pipe receiving section 97 is defined in a cylindrical inner periphery configuration extending in an opposite axial direction or in an axial direction of inner diameter sized substantially identical to an outer diameter of the pipe 53, and on an opposite axial end portion thereof defining an opening 101 of an opposite axial end portion of the tubular water shield 75. And the projection receiving section 99 is defined in a short cylindrical inner periphery configuration sized somewhat larger than the pipe receiving section 97 in inner diameter, and is continued directly to the pipe receiving section 97 and the retainer receiving section 89.

Each cover elements 63, 63 is provided with a loop sealing slot 108 starting from a contact surface of the contact portion 77 on one radial end portion, running along the opening 95 of an inner surface or an inner peripheral surface of the annular inward portion 91, an contact surface of the contact portion 77 on an opposite radial end portion, and the opening 101, then back to the contact surface of the contact portion 77 of one radial end portion. A cover sealing member of elastomeric material such as rubber is provided along and in the loop sealing slot 103 with respective cover elements 63 in two-shot injection molding process (two-shot or two-color injection molding concurrently). At respective extended portions 79, 79, the cover sealing member 105 is disposed so as to run projecting radially outwardly along the extended portion 79 and in the other cover element 63, the drain passage 81 formed in the extended portion 79 is located inside of the cover sealing member 105. Also, on a contact surface of the extended portion 79 of the other cover element 63, a communication recess 107 is formed for secure or sufficient communication between the connector receiving section 87 or the retainer receiving section 89 and the drain passage 81. This communication recess 107 functions as a communication channel or a main communication channel between the connector receiving section 87 or the retainer receiving section 89 and the drain passage 81 when the tubular water shield 75 is configured. The loop sealing slots 103, 103 have plurality of pin holes (not shown) therein respectively, through which material for the cover sealing member 105, in two-shot injection molding process, passes, and reaches outside. And then, the cover sealing members 105, 105 in loop are fixedly mounted to the cover elements 63, 63 with anchor effects.

The cover sealing member 105 is preferably made of soft resin material to enhance sealing property. Such soft resin material or resin material should be selected in view of compatibility with the cover elements 63, 63 in two-shot injection molding. In case of the cover elements 63, 63 are made of polyester resin or polyamide resin such as PA11, PA12 of excellent heat resistance property, the cover sealing members 105, 105 may be made of TPEE of good bonding compatibility therewith, and in case of cover elements 63, 63 are made of polypropylene resin such as PP, the cover sealing members 105, 105 may be made of TPO of good bonding compatibility therewith.

Two cover elements 63, 63 are joined together to hold therein, and enclose the connector 1 and the pipe 53, wherein the pipe inserting portion 5 is received in the connector receiving section 87 of the connector receiving portion 83 (the tubular holder portion 17 is received in an opposite axial side from the opening 95 or the annular inward portion 91, of the connector receiving section 87) so that the pipe inserting portion 5 and the connector receiving section 87 or the cover elements 63, 63 are held in non-rotatable relation each other by mating of the flat panel like portion 21 with flat side surface 93, the latching ends 43, 43 of the retainer 31 are received in the retainer receiving section 89, the annular projection 59 of the pipe 53 is received in the projection receiving section 99 of the pipe receiving portion 85, and the pipe 53 is enclosed in the pipe receiving section 97 of the pipe receiving portion 85. One axial side of the cylindrical sealing portion 19 of the connector 1 is outwardly extending or projecting out of the opening 95 of the tubular water shield 75. However, an outer peripheral surface of the cylindrical sealing portion 19 is sealed relative to the opening 95 by portions of the cover sealing members 105, 105 (sealing portion for opening) on the annular inward portion 91 or the opening 95. On the other hand, the pipe 53 is outwardly extending or projecting out of the opening 101 of the tubular water shield 75, an outer peripheral surface of the pipe 53 is also sealed relative to the opening 101 by portions of the cover sealing members 105, 105 (sealing portion for opening) on the opening 101 in the pipe receiving portion 85. Between the contact portions 77, 77 of the cover elements 63, 63 is sealed by the cover sealing members 105, 105 of one and the other cover elements 63, 63 contacted and depressed each other. Therefore, the connecting portion between the connector 1 and the pipe 53 are wholly waterproofed or protected against water by the connector cover 61. Meanwhile, the cover sealing members 105, 105 respectively is formed thickly on the annular inward portion 91, or the opening 95 and the opening 101, and thereby the connector 1 and the pipe 53 are sealed sufficiently relative to the opening 95 and the opening 101 respectively.

Figure 6:
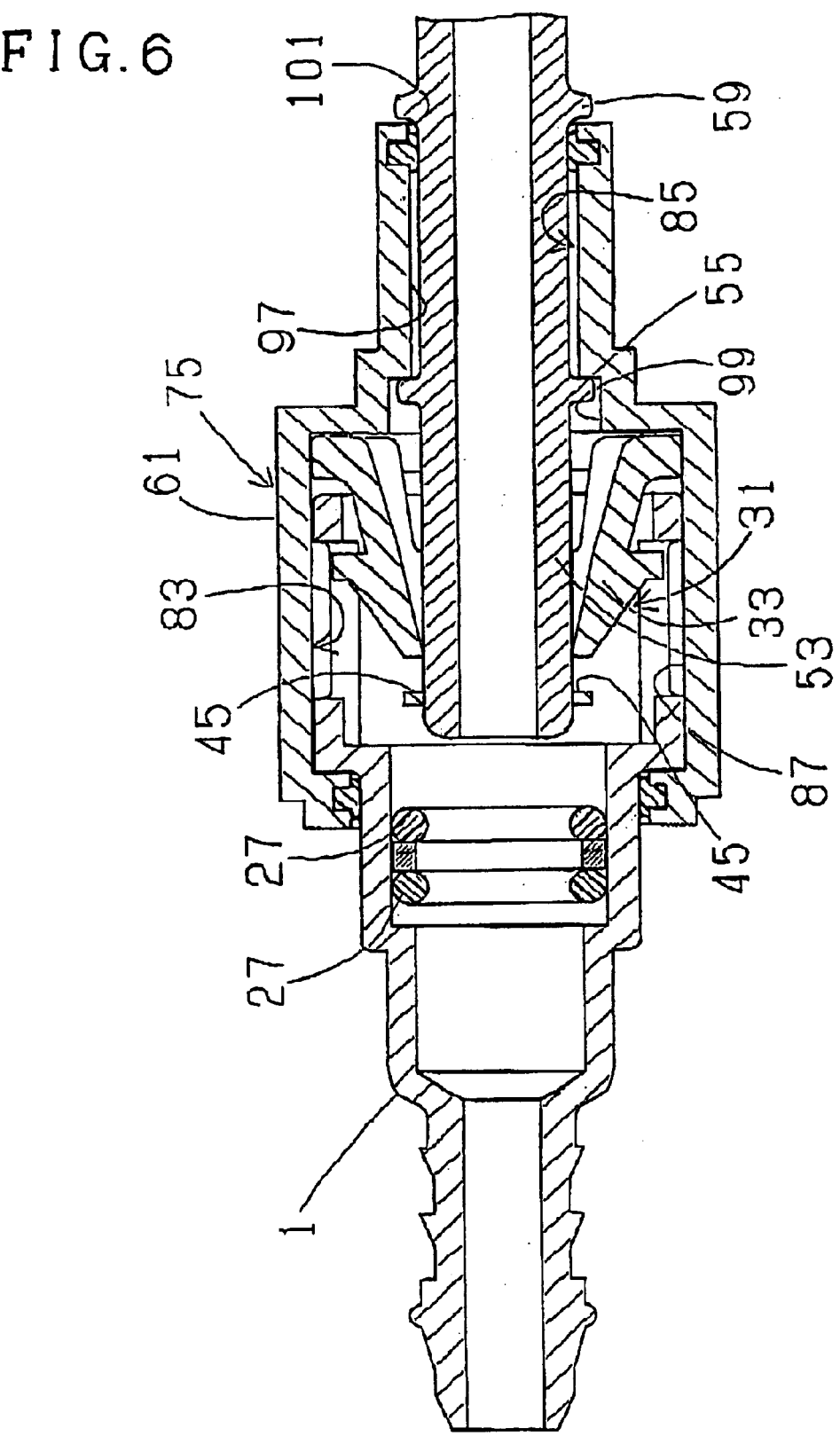
FIG. 6 is a sectional view showing a case that the connector cover is mounted to the connector and the pipe in half-fitting relation.

By the way, in case that the pipe 53 is not fully inserted in the connector 1, as a result, the annular engagement projection 55 does not snap-engage with the engagement slits 45, 45 on the main body 33 of the retainer 31, the annular projection 59 is located away from the connector 1 on an opposite axial side compared to the case that the pipe 53 is completely inserted in the connector 1. Therefore, if an operator tries to mount a connector cover 61 for providing a water shield between a pipe 53 and a connector 1 to a connecting portion so that the pipe inserting portion 5 of the connector 1 fits in the connector receiving section 87 of the connector receiving portion 83, the annular projection 59 of the pipe 53 is located in an area of the pipe receiving section 97 of the pipe receiving portion 85. However, as an inner diameter of the pipe receiving section 97 is smaller an outer diameter of the annular projection 59, the cover elements 63, 63 may not be smoothly joined each other, and a stopper 71 often cannot be engaged with a hook 73 of an opposite axial side. Also, in case that the annular projection 59 is located to come off outside of the pipe receiving section 97 or the opening 101, and that the annular engagement projection 55 is located so as to be received in the projection receiving section 99, the cover elements 63, 63 are joined each other smoothly without problem. However, as an axial length of the pipe receiving section 97 is configured longer than an axial distance between one axial end of the pipe 53 correctly fitted in the connector 1 and the O-ring 27 (an opposite axial end of the O-ring 27) on an opposite axial side, one axial end of the pipe 53 is retracted and positioned backward on an opposite axial side from the O-ring 27 on an opposite axial side, as shown in FIG. 6. That indicates that the connector 1 and the pipe 53 are not sealed properly therebetween. Therefore, when an inspection fluid (gasoline fuel) flows in the connector 1 and the pipe 53, the inspection fluid leaks out of the connecting portion between the connector 1 and the pipe 53, and is discharged out of the drain passage 81 of the connector cover 61. In case that the stopper portions 37, 37 of the retainer 31 are not fitted in the engagement windows 25, 25 of the tubular holder portion 17, the latching ends 43, 43 of the operation arms 41, 41 are located away from the connector 1 on an opposite axial side, and thus the latching ends 43, 43 are not received in the retainer receiving section 89, and the cover elements 63, 63 are not joined each other.

Figure 7:
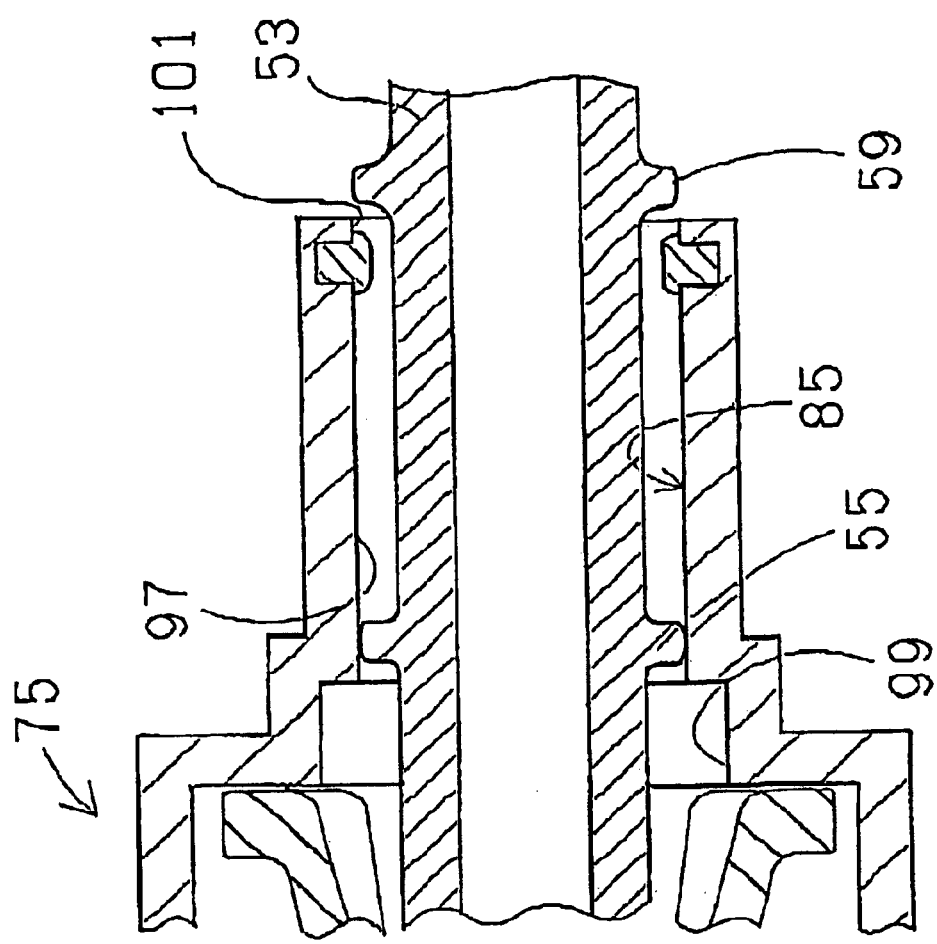
FIG. 7 is a sectional view showing a case that the connector cover is adapted to the pipe and the connector in half-fitting relation, wherein a pipe receiving section is designed longer in axial length than an axial distance between the annular engagement projection and annular projection.

If an axial length of the pipe receiving section 97 has been designed longer than an axial space between the annular engagement projection 55 and the annular projection 59 of the pipe 53, in case that the annular projection 59 is located so as to come off outside of the pipe receiving section 97 or the opening 101, the annular engagement projection 55 is located in an area of the pipe receiving section 97, as shown in FIG. 7. In this arrangement, the cover elements 63, 63 may not be joined each other, or could be managed to be joined each other by force. That enables to verify that the pipe 53 has been incompletely connected to the connector 1 at joining the cover elements 63, 63 each other, or at mounting the connector cover 61 to the connector 1 and the pipe 53. Here, even in case that the annular projection 59 is located so as to come off outside of the pipe receiving section 97, it is not necessarily required that one axial end of the pipe 53 is located backward on an opposite axial side from the O-ring 27.

Figure 8:
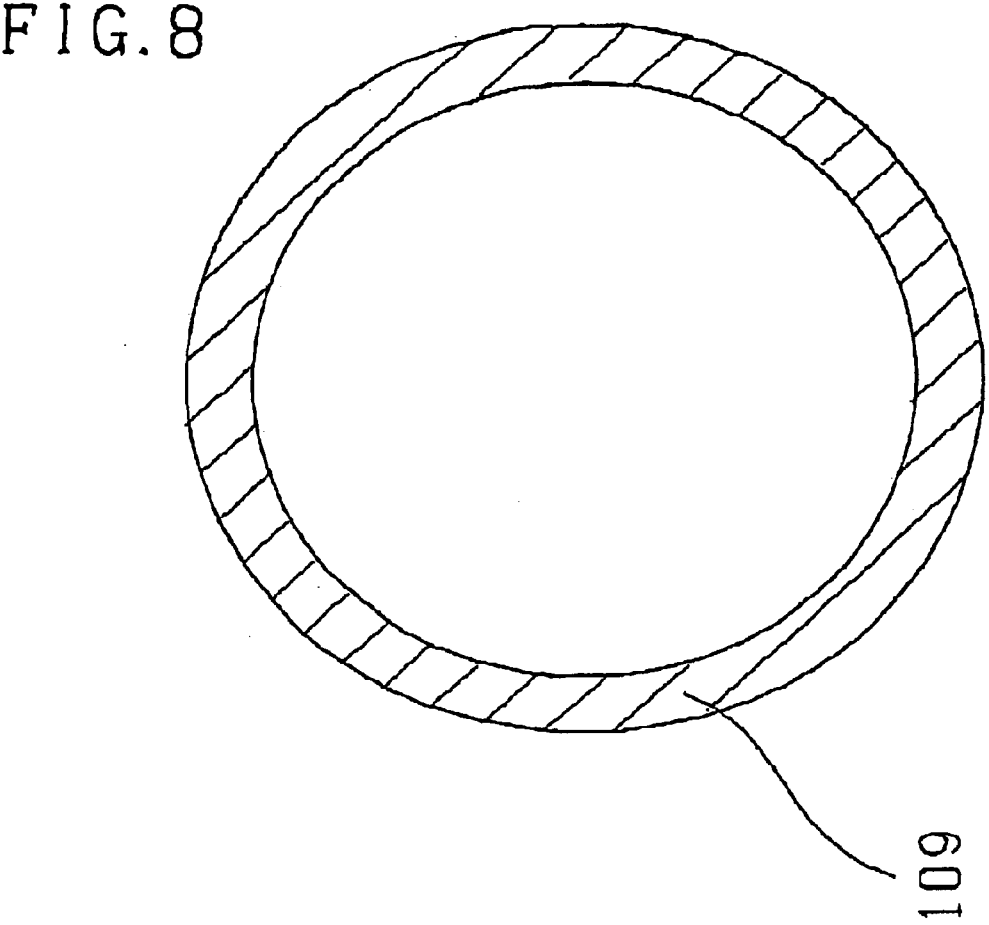
FIG. 8 is a sectional view showing a state of mounting the connector cover when an exhaust pipe is disposed proximate thereto.
Figure 8:
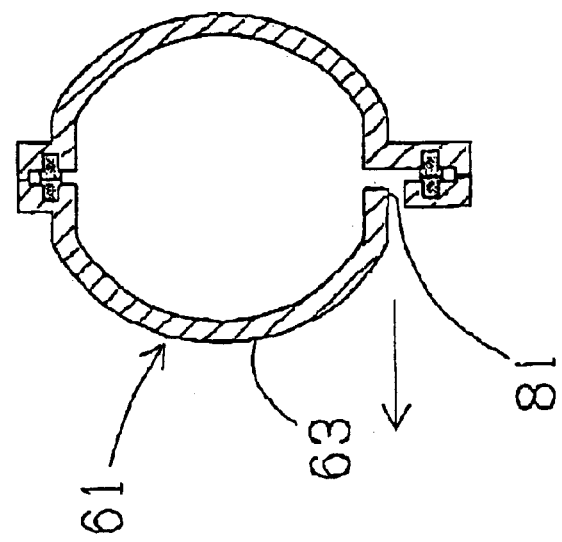

The connector cover 61 is mounted on the connecting portion between the connector 1 and the pipe 53 so that the drain passage 81 is located downward. Meanwhile, in case that the tubular water shield 75 is constructed on the connector 1 and the pipe 53 disposed proximate to the exhaust pipe 109, for example, proximate and parallel thereto, or proximate and generally parallel thereto, as shown in FIG. 8, the drain passage 81 should be formed in the cover element 63 (here, the other cover element 63 having the hook portion 69) to be located in the opposite side or the distant side of the exhaust pipe 109, and thereby the drain passage 81 should be disposed away from the exhaust pipe 109. In this way, a gasoline leaked out of the connector cover 61 or the tubular water shield 75 is to be discharged opposite to the exhaust pipe 109 or away from exhaust pipe 109.

We claim:

1. A connector cover for providing a water shield between a connector for a fluid path and a pipe inserted and fitted in the connector, the connector having a tube connecting portion on one axial side thereof, and a pipe inserting portion on an opposite axial side thereof, the pipe being inserted into an opening on an axial end of the pipe inserting portion so as to be sealed with respect to the connector with a connector sealing member or members, and being provided with an annular projection on an outer periphery thereof to be located axially outwardly from the opening, the pipe further being provided with an annular engagement projection on the outer periphery of one axial side from the annular projection of the pipe, the annular engagement projection being snap-engaged with a retainer fitted in the pipe inserting portion of the connector, the connector cover comprising:

a mounting body adapted to be mounted to a length that extends from the pipe inserting portion of the connector to an opposite axial side of the annular projection of the pipe, the mounting body constituting a tubular water shield on the connector and the pipe, the tubular water shield internally having a connector receiving portion on one axial side thereof for receiving the pipe inserting portion of the connector so that the tube connecting portion of the connector is extending outwardly from said one axial side of the tubular water shield, and a pipe receiving portion on an opposite axial side thereof for receiving the pipe including the annular projection so that an opposite axial side of the annular projection of the pipe is extending outwardly from said opposite axial side of the tubular water shield, the pipe receiving portion having a projection receiving section formed in one axial side of the pipe receiving portion for receiving the annular projection of the pipe, and a pipe receiving section formed on an opposite axial side of the pipe receiving portion, the pipe receiving section having an inner diameter generally identical to an outer diameter of the pipe to be received, for receiving a portion of said opposite axial side of the annular projection of the pipe, and an axial length of the pipe receiving section of the pipe receiving portion being longer than an axial distance between the annular engagement projection and the annular projection of the pipe.

2. The connector cover as set forth in claim 1 wherein:

the connector cover or the mounting body, includes:

a pair of cover elements joined to each other so as to radially hold therebetween and enclose said length from the pipe inserting portion of the connector to said opposite axial side of the annular projection of the pipe for constituting the tubular water shield, a cover sealing member or members provided between one and the other cover elements, one axial end portion of the tubular water shield and the connector, and an opposite axial end portion thereof and the pipe, the cover elements being made of polyester resin, and the cover sealing member or members being made of ester TPE or TPEE, of the cover elements being made of polypropylene resin, and the cover sealing member or members being made of olefin TPE or TPO.

3. The connector cover as set forth in claim 2 wherein:

the two cover elements are hinged to each other on one radial end portion thereof.

4. The connector cover as set forth in claim 1 wherein:

the connector is for a gasoline fuel path in a vehicle, in proximity to which an exhaust pipe is arranged, the connector cover or the mounting body is provided with a drain passage therein for discharging gasoline fuel out of the tubular water shield, and the drain passage is formed in the connector cover or the mounting body so as to be disposed away from the exhaust pipe when the tubular water shield is constructed.

5. A connector cover for providing a water shield between a connector for a fluid path and a pipe inserted in and snap-engaged with the connector, the connector having a tube connecting portion on one axial side thereof, and a pipe inserting portion on an opposite axial side thereof, the pipe being inserted into an opening on an axial end of the pipe inserting portion so as to be sealed with respect to the connector with a connector sealing member or members, and being provided with an annular projection on an outer periphery thereof to be located axially outwardly from the opening, the connector cover comprising:

a mounting body adapted to be mounted to a length that extends from the pipe inserting portion of the connector to an opposite axial side of the annular projection of the pipe, the mounting body constituting a tubular water shield on the connector and the pipe, the tubular water shield having internally a connector receiving portion on one axial side thereof for receiving the pipe inserting portion of the connector so that the tube connecting portion of the connector is extending outwardly from said one axial side of the tubular water shield, and a pipe receiving portion on an opposite axial side thereof for receiving the pipe including the annular projection so that an opposite axial side of the annular projection of the pipe is extending outwardly from said opposite axial side of the tubular water shield, the pipe receiving portion having a projection receiving section formed in one axial side of the pipe receiving portion for receiving the annular projection of the pipe, and a pipe receiving section formed on an opposite axial side of the pipe receiving portion, the pipe receiving section having an inner diameter generally identical to an outer diameter of the pipe to be received, for receiving a portion of said opposite axial side of the annular projection of the pipe, and an axial length of the pipe receiving section of the pipe receiving portion being as long or longer than an axial distance between one axial end of the pipe inserted in and snap-engaged with the connector and an opposite axial end of the connector sealing member or members.

6. A connector cover for providing a water shield between a connector for a fluid path and a pipe inserted in and snap-engaged with the connector, the connector having a tube connecting portion on one axial side thereof and a pipe inserting portion on an opposite axial side thereof, the pipe being inserted into an opening on an axial end of the pipe inserting portion so as to be sealed with respect to the connector with a connector sealing member or members, and being provided with an annular projection on an outer periphery thereof to be located axially outwardly from the opening, the connector cover comprising:

a mounting body adapted to be mounted to a length that extends from the pipe inserting portion of the connector to an opposite axial side of the annular projection of the pipe, the mounting body constituting a tubular water shield on the connector and the pipe, the tubular water shield having internally a connector receiving portion on one axial side thereof for receiving the pipe inserting portion of the connector so that the tube connecting portion of the connector is extending outwardly from said one axial side of the tubular water shield, and a pipe receiving portion on an opposite axial side thereof for receiving the pipe including the annular projection so that an opposite axial side of the annular projection of the pipe is extending outwardly from said opposite axial side of the tubular water shield, the pipe receiving portion having a projection receiving section formed in one axial side of the pipe receiving portion for receiving the annular project on of the pipe, and a pipe receiving section formed on an opposite axial side of the pipe receiving portion, the pipe receiving section having an inner diameter generally identical to an outer diameter of the pipe to be received, for receiving a portion of said opposite axial side of the annular projection of the pipe, and the connector cover or the mounting body, including;

a pair of cover elements joined to each other so as to radially hold therebetween and enclose said length from the pipe inserting portion of the connector to said opposite axial side of the annular projection of the pipe for constituting the tubular water shield, a cover sealing member or members provided between the cover elements, one axial end portion of the tubular water shield and the connector, and an opposite axial end portion thereof and the pipe, and the cover elements being made of polyester resin, and the cover sealing member or members being made of ester TPE or TPEE or the cover elements being made of polypropylene resin, and the cover sealing member or members being made of olefin TPE or TPO.

7. The connector cover as set forth in claim 6 wherein:

the two cover elements are hinged to each other on one radial end portion thereof.

8. A connector cover for providing a water shield between a connector for a fluid path and a pipe inserted in and snap-engaged with the connector, the connector having a tube connecting portion on one axial side thereof; and a pipe inserting portion on an opposite axial side thereof, the pipe being inserted into an opening on an axial end of the pipe inserting portion so as to be sealed with respect to the connector with a connector sealing member or members, and being provided with an annular projection on an outer periphery thereof to be located axially outwardly from the opening, the connector cover comprising:

a mounting body adapted to be mounted to a length that extends from the pipe inserting portion of the connector to an opposite axial side of the annular projection of the pipe, the mounting body constituting a tubular water shield on the connector and the pipe, the tubular water shield having internally a connector receiving portion on one axial side thereof for receiving the pipe inserting portion of the connector so that the tube connecting portion of the connector is extending outwardly from said one axial side of the tubular water shield, and a pipe receiving portion on an opposite axial side thereof for receiving the pipe including the annular projection so that an opposite axial side of the annular projection of the pipe is extending outwardly from said opposite axial side of the tubular water shield, the pipe receiving portion having a projection receiving section formed in one axial side of the pipe receiving portion for receiving the annular projection of the pipe, and a pipe receiving section formed on an opposite axial side of the pipe receiving portion, the pipe receiving section having an inner diameter generally identical to an outer diameter of the pipe to be received, for receiving a portion of said opposite axial side of the annular projection of the pipe, the connector being for a gasoline fuel path in a vehicle, in proximity to which an exhaust pipe is arranged, the connector cover or the mounting body being provided with a drain passage therein for discharging gasoline fuel out of the tubular water shield, and the drain passage being formed in the connector cover or the mounting body so as to be disposed away from the exhaust pipe when the tubular water shield is constructed.

* * * * *